US006521008B1

(12) United States Patent
Lenzing et al.

(10) Patent No.: US 6,521,008 B1
(45) Date of Patent: Feb. 18, 2003

(54) AIR FILTER FOR FILTERING INDUCED AIR FOR INTERNAL COMBUSTION ENGINES OF MOTOR VEHICLES

(75) Inventors: Thomas Lenzing, Ludwigsburg (DE); Uwe Konzelmann, Asperg (DE); Waldemar Guenther, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,156

(22) PCT Filed: Sep. 5, 2000

(86) PCT No.: PCT/DE00/03043

§ 371 (c)(1),
(2), (4) Date: Sep. 7, 2001

(87) PCT Pub. No.: WO01/18379

PCT Pub. Date: Mar. 15, 2001

(30) Foreign Application Priority Data

Sep. 7, 1999 (DE) ........................................ 199 42 503

(51) Int. Cl.[7] ................................................ B01D 19/00

(52) U.S. Cl. .......................... 55/385.3; 55/343; 55/440; 96/228; 96/262; 96/303; 261/117; 261/DIG. 9; 210/122

(58) Field of Search ................................ 55/385.3, 343, 55/440; 96/118, 228, 242, 255, 262, 303; 261/117, DIG. 9; 210/122

(56) References Cited

U.S. PATENT DOCUMENTS

| | | | | | |
|---|---|---|---|---|---|
| 1,980,522 | A | * | 4/1934 | Hawley | 96/228 |
| 3,350,322 | A | * | 10/1967 | Waterhouse | 96/242 |
| 3,386,229 | A | * | 6/1968 | Reed | 96/262 |
| 4,574,874 | A | * | 3/1986 | Duran | 165/43 |
| 5,037,459 | A | * | 8/1991 | Spruill et al. | 96/118 |
| 5,180,406 | A | * | 1/1993 | Shih | 96/262 |
| 5,201,919 | A | * | 4/1993 | Jahn et al. | 96/262 |
| 5,507,858 | A | * | 4/1996 | Jepson | 96/262 |
| 5,702,593 | A | * | 12/1997 | Horsley et al. | 210/122 |
| 5,800,595 | A | * | 9/1998 | Wright | 95/288 |
| 5,871,562 | A | * | 2/1999 | Culoso | 95/26 |

* cited by examiner

*Primary Examiner*—David A. Simmons
*Assistant Examiner*—Minh-Chau T. Pham
(74) *Attorney, Agent, or Firm*—Ronald E. Greigg

(57) ABSTRACT

In an air filter for filtering the intake air for internal combustion engines of motor vehicles, with a filter housing, which has an air inlet, an air outlet, and at least one water outlet disposed in the housing bottom, and with a replaceable filter matte disposed in the filter housing between the air intake and air outlet, in order to separate water particles from the intake air and in order to optimally discharge the separated water from the filter housing, a water separator is disposed upstream of the filter matte in the filter housing and means are provided in the at least one water outlet, which produce a water level in the water outlet of such a height that the vacuum in the filter housing acting on the water outlet is compensated for.

20 Claims, 1 Drawing Sheet

AIR FILTER FOR FILTERING INDUCED AIR FOR INTERNAL COMBUSTION ENGINES OF MOTOR VEHICLES

CROSS-REFERENCE TO RELATED APPLICATIONS

This application is a 35 USC 371 application of PCT/DE 00/03043 filed on Sep. 5, 2000.

BACKGROUND OF THE INVENTION

1. Field of the Invention

The invention relates to an air filter and particularly to such a filter for filtering the intake air for internal combustion engines of motor vehicles.

2. Description of the Prior Art

Air filters for filtering the intake air for internal combustion engines which are known for example from Bosch "Kraftfahrtechnisches Taschenbuch" [Automotive Handbook] 1998, p. 422 ff., to keep the dust contained in the intake air away from the engine and prevent a premature wear on the engine. The filter matte, which retains the dust and must be replaced at maintenance intervals, is matched to the engine in order to optimize performance, fuel consumption, and damping of the intake noise. A number of outlet bores are provided in the bottom of the filter housing in order to discharge condensation water that forms in the filter housing.

U.S. Pat. No. 5,507,858 has disclosed a device for separating the gaseous and fluid liquid phases of a gas/oil mixture in a pipeline, which has a housing with an inlet and an outlet inserted into the pipeline, which housing contains a water separator. The water separator, which is comprised of a perforated plate, is aligned in oblique fashion, i.e. at an acute angle to the axes of the inlet and outlet, and divides the housing into a housing section connected to the inlet and a housing section connected to the outlet. A liquid outlet is provided in the latter housing section so that the liquid being separated in the water separator can be discharged from the housing.

SUMMARY OF THE INVENTION

The air filter according to the invention, has the advantage that on the one hand, water particles contained in the intake air are precipitated in the water separator and adhere to the bottom of the filter housing and on the other hand, the water collecting at the bottom of the filter housing is also reliably discharged via the water outlet during operation of the engine and does not collect in the dead flow spaces of the filter housing. As a result, the filter matte in the filter housing becomes less moist and cannot become fully laden with moisture so that secondary malfunctions on the clean air side due to water passing through the fully laden filter matte can be prevented.

According to an advantageous embodiment of the invention, the necessary water level in the water outlet is realized by virtue of the fact that an outlet opening in the filter housing is connected to an outlet tube in the course of which an annular loop or a meandering bow is embodied after the fashion of a water seal. In this connection, the outlet tube is preferably embodied as a hose.

According to a preferred embodiment of the invention, the means for producing the water level have an outlet tube which leads from an outlet opening in the filter housing and is filled with absorbent material. A similar absorption effect is also produced by means of a high surface roughness of the inner tube wall of the outlet tube or through the provision of a constriction in the course of the outlet tube.

All the above-mentioned embodiments have the advantage that less space is required underneath the filter housing to accommodate the outlet tube than is the case with the embodiment of a loop or bow in the outlet tube. In addition, there is not a constant water seal in the outlet tube which can freeze in winter, but instead, the water level is only built up to the required level during operation of the engine through the mechanism of absorbency. Trials have shown that an improved water separation is produced, independent of this fact.

BRIEF DESCRIPTION OF THE DRAWINGS

The invention will be explained in detail in the description below in conjunction with exemplary embodiments shown in the drawings, in which.

DESCRIPTION OF THE PREFERRED EMBODIMENTS

Figure 1:
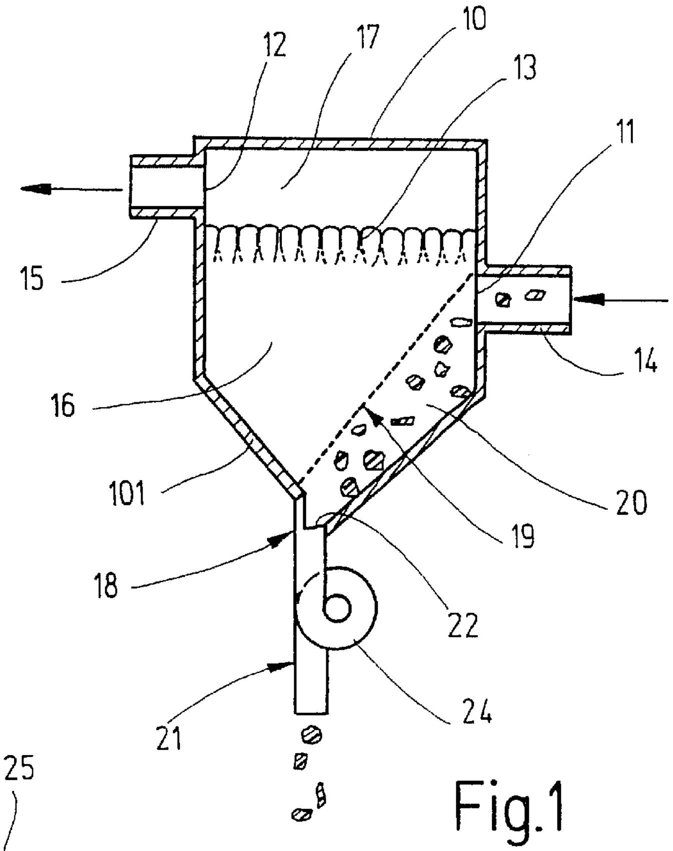
FIG. 1 is a longitudinal section through an air filter for the intake section of an internal combustion engine.

FIG. 1 schematically depicts a longitudinal section through an air filter for filtering the intake air of an internal combustion engine in a motor vehicle, which has a filter housing 10 with an air inlet 11, an air outlet 12, and a replaceable filter matte 13 dispose between the air inlet 11 and air outlet 12. The air inlet 11 is provided with an air inlet fitting 14 and the air outlet 12 is provided with a connection fitting 15 which, after installation of the filter housing 10 in the motor vehicle, is connected to the intake tube of the internal combustion engine. In the installation position, the filter matte 13 is aligned for example horizontally and divides the inner chamber of the filter housing 10 into a lower housing chamber 16 whose upper region contains the air inlet 11 and an upper housing chamber 17 which is connected to the air outlet 12. The housing bottom 101 of the filter housing 10 is embodied in the shape of a funnel and at its deepest point, is provided with a water outlet 18.

In order to improve water separation from the air, which enters via the air inlet 11 and is laden with moisture or water droplets, a water separator 19 is disposed upstream of the filter matte 13. The water separator 19 is inclined at an acute angle to the axis of the air inlet 11 and separates the lower housing chamber 16 from a frontal region 20 which contains both the air inlet 11 and the water outlet 18. The water separator 19 is embodied as a grating, e.g. made of non-rusting, knitted metal, or the like wherein the grating meshes or honeycombs are, for example, approximately 0.8×1.6 mm in size. During driving operation, a vacuum prevails in the filter housing 10, which cannot discharge the water, which has been precipitated from the air flow and has collected at the housing bottom 101, via the water outlet 18, or can only do so poorly. As a result, the filter matte 13 can become fully laden with water and, after its storage capacity is expended, water penetrates through the filter matte 13, gets into the clean air-side intake section of the engine, and can cause malfunctions in sensors disposed there. In order to prevent this, means are disposed in the water outlet 18, which produce a water level in the water outlet 18 of such a height that the vacuum acting on the water outlet 18 is compensated for. These means can be realized in various ways, where in all cases, the water outlet 18 is provided with an outlet tube 21 which leads on the underside of the filter housing 10 and encompasses an outlet opening 22 in the housing bottom 101.

Figure 2:
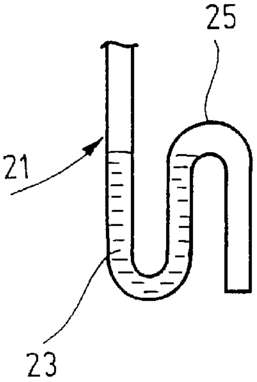
FIG. 2 shows a detail of a side view of the lower region of the air filter in FIG. 1 according to a second exemplary embodiment, and FIGS. 3–5 each show a longitudinal section through the lower region of the air filter in FIG. 1 according to additional exemplary embodiments.

In the air filter shown in FIG. 1, the means for producing the water level are realized by means of a loop 24 embodied in the course of the outlet tube 21, which is preferably embodied as a hose. A water column 23 (indicated by hatching in FIG. 2) is always present in this loop 24 and, with a corresponding embodiment of the loop 24, neutralizes the action of the vacuum prevailing in the filter housing 10 on the water outlet 18. Instead of the loop 24, the outlet tube 21 can also be embodied with a meandering bow 25 (FIG. 2) by virtue of the outlet tube 21 being provided with two 180° bends. The height of the bow 25 determines the height of the water column 23 always present in the outlet tube 21, in order to compensate for the vacuum in the filter housing 10.

Figure 3:
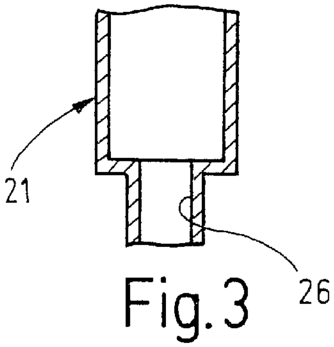

In the exemplary embodiment of FIG. 3, in a tube section remote from the outlet opening 22, the outlet tube 21 is provided with a constriction 26 of its internal diameter. Due to the constriction 26, the water level in the outlet tube 21 required for the compensation of the vacuum in the filter housing 10 automatically builds up only in the course of driving operation. When the engine is switched off and therefore when the vacuum is in the process of ceasing, the water is discharged completely from the filter housing 10 so that in winter, the water outlet 18 is prevented from freezing.

Figure 4:
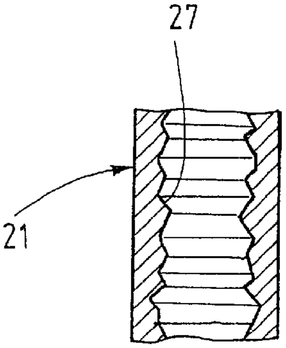

The same effect of the water level, which automatically builds up as a result of increasing water entry into the air filter during driving operation, is achieved with the embodiment of the outlet tube 21 according to FIG. 4. In this instance, the inner tube wall of the outlet tube 21 is provided with a considerable surface roughness 27.

Figure 5:
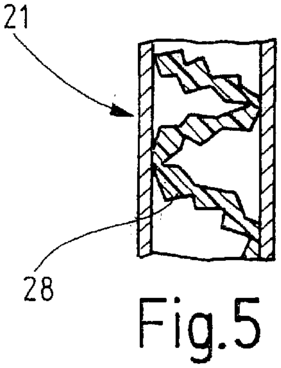

With the means for producing the water level shown in FIG. 5, the mechanism of absorbency is used to produce the required water level during driving operation. In this instance, the means are realized through an absorbent material 28 with which the intake tube 21 is filled. An absorbent material of this kind can be a sponge or a textile wick.

In all of the exemplary embodiments according to FIGS. 2 to 5, the outlet tube 21 can be embodied as a hose.

The foregoing relates to preferred exemplary embodiments of the invention, it being understood that other variants and embodiments thereof are possible within the spirit and scope of the invention, the latter being defined by the appended claims.

We claim:

1. In an air filter for filtering the intake air for internal combustion engines of motor vehicles, with a filter housing (10), which has an air inlet (11) connected to an intake fitting (14) and an air outlet (12) that can be connected to an intake tube of the engine, and at least one water outlet (18) disposed in the housing bottom (101), and with a replaceable filter matte (13) disposed in the filter housing (10) between the air intake (11) and air outlet (12), the improvement wherein a water separator (19) is disposed upstream of the filter matte (13) in the filter housing (10) and means are provided in the at least one water outlet (18), which produce a water level (23) in the water outlet (18) of such a height that the vacuum in the filter housing (10) acting on the water outlet (18) is compensated for.

2. The air filter according to claim 1, wherein the means for producing the water level have an outlet tube (21) which leads from an outlet opening (22) in the filter housing (10) and has a loop (24) or a meandering bow (25) embodied in it.

3. The air filter according to claim 1, wherein the means for producing the water level have an outlet tube (21) which leads from an outlet opening (22) in the filter housing (10) and, in a tube section remote from the outlet opening (22), is provided with a constriction (26) of its internal diameter, the constriction being sized and configured so that water will build up while the engine is operating, and be released when the engine is shut down.

4. The air filter according to claim 1, wherein the means for producing the water level have an outlet tube (21) which leads from an outlet opening (22) in the filter housing (10) and has a high surface roughness (27) on the inside for controlling the amount of fluid which flows through the tube.

5. The air filter according to claim 1, wherein the means for producing the water level have an outlet tube (21) which leads from an outlet opening (22) in the filter housing (10) and whose hollow inside is filled with an absorbent material (28).

6. The air filter according to claim 5, wherein a sponge or a textile wick is used as the absorbent material.

7. The air filter according to claim 2, wherein the outlet tube (21) is embodied as a hose.

8. The air filter according to claim 1, wherein the water separator (19) is disposed inclined at an acute angle to the axis of the air inlet (11) of the filter housing (10) and separates the lower inner chamber (16) of the filter housing (10) disposed beneath the filter matte (13) from a frontal region (20) which contains the air inlet (11) and the water outlet (18).

9. The air filter according to claim 1, wherein the water separator (19) is embodied as a grating.

10. The air filter according to claim 9, wherein the grating meshes or honeycombs are approximately 0.8×1.6 mm in size.

11. The air filter according to claim 3, wherein the outlet tube (21) is embodied as a hose.

12. The air filter according to claim 4, wherein the outlet tube (21) is embodied as a hose.

13. The air filter according to claim 8, wherein the outlet tube (21) is embodied as a hose.

14. The air filter according to claim 6, wherein the outlet tube (21) is embodied as a hose.

15. The air filter according to claim 2, wherein the water separator (19), is disposed inclined at an acute angle to the axis of the air inlet (11) of the filter housing (10) and separates the lower inner chamber (16) of the filter housing (10) disposed beneath the filter matte (13) from a frontal region (20) which contains the air inlet (11) and the water outlet (18).

16. The air filter according to claim 3, wherein the water separator (19) is disposed inclined at an acute angle to the axis of the air inlet (11) of the filter housing (10) and separates the lower inner chamber (16) of the filter housing (10) disposed beneath the filter matte (13) from a frontal region (20) which contains the air inlet (11) and the water outlet (18).

17. The air filter according to claim 4, wherein the water separator (19) is disposed inclined at an acute angle to the axis of the air inlet (11) of the filter housing (10) and separates the lower inner chamber (16) of the filter housing (10) disposed beneath the filter matte (13) from a frontal region (20) which contains the air inlet (11) and the water outlet (18).

18. The air filter according to claim 5, wherein the water separator (19) is disposed inclined an acute angle to the axis of the air inlet (11) of the filter housing (10) and separates the lower inner chamber (16) of the filter housing (10) disposed beneath the filter matte (13) from a frontal region (20) which contains the air inlet (11) and the water outlet (18).

19. The air filter according to claim 7, wherein the water separator (19) is disposed inclined at an acute angle to the axis of the air inlet (11) of the filter housing (10) and separates the lower inner chamber (16) of the filter housing (10) disposed beneath the filter matte (13) from a frontal region (20) which contains the air inlet (11) and the water outlet (18).

20. The air filter according to claim 17, wherein the water separator (19) is embodied as a grating.

* * * * *